United States Patent [19]
Levine et al.

[11] Patent Number: 6,134,710
[45] Date of Patent: Oct. 17, 2000

[54] ADAPTIVE METHOD AND SYSTEM TO MINIMIZE THE EFFECT OF LONG CACHE MISSES

[75] Inventors: Frank Eliot Levine; Charles Philip Roth, both of Austin, Tex.

[73] Assignee: International Business Machines Corp., Armonk, N.Y.

[21] Appl. No.: 09/105,946

[22] Filed: Jun. 26, 1998

[51] Int. Cl.[7] ..................................................... G06F 9/45
[52] U.S. Cl. ..................... 717/9; 717/4; 717/5; 711/206; 714/47
[58] Field of Search ..................................... 395/704–709; 711/3, 117, 118, 202, 203, 207, 215, 216, 221, 201; 714/25, 47, 48, 32, 35, 37, 38, 39; 702/182, 183, 185; 712/207, 216, 219, 233, 237, 244

[56] References Cited

U.S. PATENT DOCUMENTS

| | | | |
|---|---|---|---|
| 5,404,484 | 4/1995 | Schlansker et al. | 711/133 |
| 5,452,457 | 9/1995 | Alpert et al. | 395/700 |
| 5,557,548 | 9/1996 | Gover et al. | 364/551.01 |
| 5,613,118 | 3/1997 | Heisch et al. | 395/709 |
| 5,659,752 | 8/1997 | Heisch et al. | 395/704 |
| 5,691,920 | 11/1997 | Levine et al. | 364/551.01 |
| 5,701,495 | 12/1997 | Arndt et al. | 395/736 |
| 5,710,724 | 1/1998 | Burrows | 714/34 |
| 5,727,167 | 3/1998 | Dwyer et al. | 395/280 |
| 5,729,726 | 3/1998 | Levine et al. | 395/580 |
| 5,740,443 | 4/1998 | Carini | 395/705 |
| 5,748,855 | 5/1998 | Levine et al. | 395/800.23 |
| 5,768,500 | 6/1998 | Agrawal et al. | 714/47 |
| 5,940,621 | 8/1999 | Caldwell | 395/709 |

OTHER PUBLICATIONS

U.S. application No. 08/738,748 Levine et al., filed Oct. 28, 1996.

Welbon et al., "Load miss performance analysis methodology using the PowerPC 604 performance monitor for OLTP workload", Proc. of COMPCON '96, IEEE, 1996, pp. 111–116.

Abraham et al., "Predictability of load/store instruction latencies", IEEE, 1993, pp. 139–152.

Ozawa et al., "Cache miss heuristics and preloading techniques for general–purpose programs", Proc. of MICRO–28, IEEE, 1995, pp. 243–248.

Srivastava et al., "ATOM: A system for building customized program analysis tools", SIGPLAN '94, ACM, 1994, pp. 196–205.

Grove et al., "GEM optimizing compilers for Alpha AXP systems", IEEE, 1993, 465–472.

*Primary Examiner*—Kakali Chaki
*Attorney, Agent, or Firm*—Anthony England; Taylor Russell & Russell, P.C.

[57] ABSTRACT

Current software technology entails writing application programs in a high level language intended to facilitate portability to different computer processor platforms. Because the program is portable, the resulting object code is not tailored to run as efficiently as possible on the particular computer processor platform. Manually tuning a specific application program may be done, but it is time consuming and is rarely done by the end user. The disclosed invention provides an automated method of tuning application programs to execute more efficiently. Based on several system parameters provided by the user, the disclosed method comprises profiling an application to determine where significant delays are occurring that result from long cache misses, constructing effective address tables to identify the effective addresses associated with the most significant delays, optimizing the placement of preload or touch instructions that initiate execution of identified instructions prior to their placement in the program sequence, building an optimized change file, and applying the optimized change file to the object code. The optimized change file may be inserted into the object code on a real-time basis.

30 Claims, 11 Drawing Sheets

| BITS 0-4 COUNTING ENABLES | BIT 5 INTERRUPT ENABLES | BITS 6-9 TIME/EVENT TRANSITION | BITS 10-15 THRESHOLD VALUE | BIT 16 PMC0 INTERRUPT CONTROL | BIT 17 PMC1 INTERRUPT CONTROL | BIT 18 PMC1 COUNT CONTROL | BITS 19-25 PMC0 EVENT CONTROL | BITS 26-31 PMC1 EVENT CONTROL |
|---|---|---|---|---|---|---|---|---|

— 110

BIT 0 — FREEZE COUNT IN PMCs (FC)
BIT 1 — FREEZE COUNT IN SUPERVISOR STATE (FCS)
BIT 2 — FREEZE COUNT IN PROBLEM STATE (FCP)
BIT 3 — FREEZE COUNT WHILE MSR BIT PM=1
BIT 4 — FREEZE COUNT WHILE MSR BIT PM=0

MONITOR MODE CONTROL REGISTER 0 (MMCR0)

FIG-3A

| BITS 0-4 PMC2 EVENT SELECTION | BITS 5-9 PMC3 EVENT SELECTION | BITS 10-14 PMC4 EVENT SELECTION | BITS 15-19 PMC5 EVENT SELECTION | BITS 20-24 PMC6 EVENT SELECTION | BITS 25-28 PMC7 EVENT SELECTION | BIT 29 FCUIABR | BIT 30 UPDATING MODE PMC0 | BIT 31 UPDATING MODE PMC1 |
|---|---|---|---|---|---|---|---|---|

— 120

BIT 29 — FREEZE COUNTING UNTIL AN INSTRUCTION ADDRESS BREAKPOINT REGISTER MATCH OCCURS

MONITOR MODE CONTROL REGISTER 1 (MMCR1)

FIG-3B

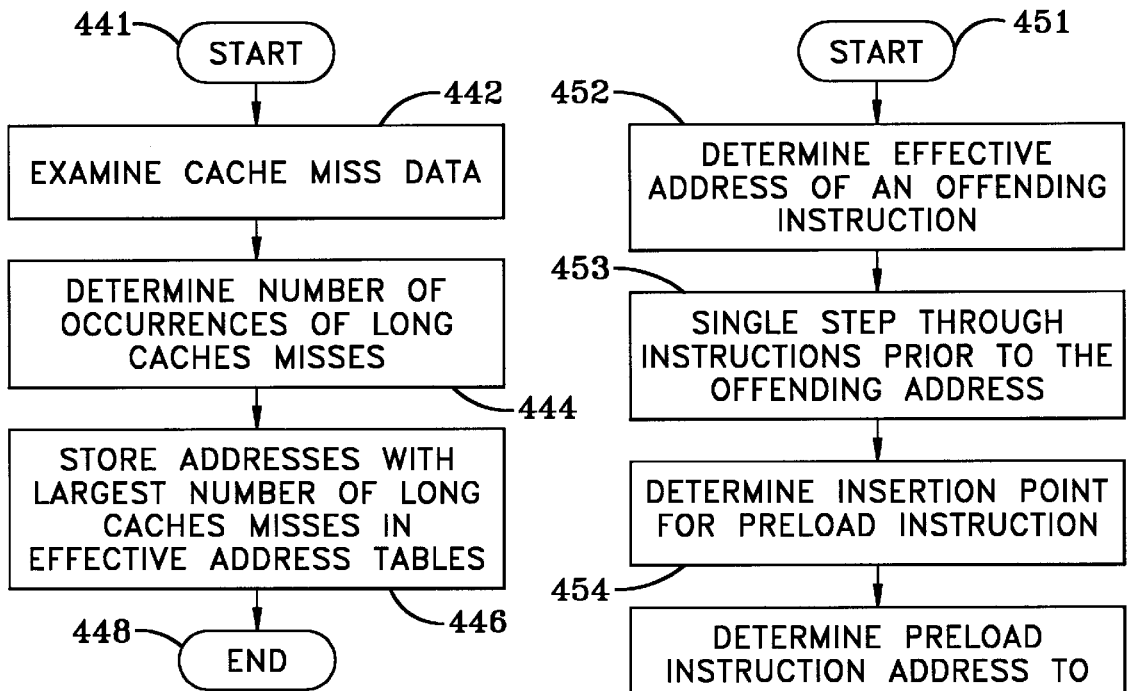

ADAPTIVE METHOD AND SYSTEM TO MINIMIZE THE EFFECT OF LONG CACHE MISSES

FIELD OF THE INVENTION

The field of the invention relates generally to monitoring the performance of a computer processing system for improvement in its operation. More particularly, the present invention relates to monitoring the performance of the operation of a computer processing system when executing an application program by profiling the instances of operational segments of the program such as long table walks and cache misses, analyzing the profiled data, and modifying the object code on-line in order to improve the operation of the application program in the processing system.

BACKGROUND OF THE INVENTION

Profiling the execution of an application program in computer processing systems has shown that it may take a long time to execute certain segments of the program. These delays are often caused by long table walks or long cache misses. This is often the result of writing the application program in a high level language that can be easily ported to different platform configurations. Also, tuning the application program to run efficiently on a specific platform configuration is usually given lower priority than providing new functions in the application program. As a result, tuning an application program to run more efficiently on a specific platform configuration is performed for only a few applications.

There are several approaches that have been developed to optimize or tune object code to run more efficiently on a specific platform configuration. One approach is described in U.S. Pat. No. 5,452,457. Under this approach, compiler directives are inserted in the source code, the source code is compiled, and the resultant object code is performance tested and data is accumulated. Based on the accumulated data, the compiler directives are modified and the source code is recompiled. Another approach is to profile an application program to identify the critical blocks in the code, and to hand tune the code to minimize the effects of critical blocks such as long table walks or long cache misses. All of the known approaches to optimizing can require a significant amount of off-line operator interaction and analysis. Because of the complexity of the issues involved, application program optimization is not usually performed by the end user. Other patents relating to performance monitoring include U.S. Pat. Nos. 5,727,167 and 5,748,855.

Therefore, there is a need for an automated method of optimizing application programs on a specific platform configuration that minimizes the effects of long table walks and long cache misses. It is desirable that this optimization can be performed by the end user as the need arises.

SUMMARY OF THE INVENTION

The present invention provides an automated method of optimizing application programs on a specific hardware platform configuration that minimizes the effects of long table walks and long cache misses, while enabling the end user to perform this optimization when needed. In accordance with one aspect of the present invention, the platform configurations to be optimized include a performance monitoring capability. This performance monitoring capability is a software accessible mechanism for providing detailed information concerning the utilization of the processor instruction execution and memory management operation. The performance monitor, as found on the PowerPC manufactured by IBM Corporation, consists of an implementation dependent number of 32 bit counters for counting processor and memory management related events. The number of performance monitor counters may vary, but is typically between two and eight 32 bit counters (PMC0, PMC1, ..., PMC7). The performance monitor counters are controlled by two monitor mode control registers (MMCR0, MMCR1) that establish the function of the counters. The performance monitor counters and the monitor mode control registers are addressable for read and write instructions. The monitor mode control registers are partitioned into bit fields that allow for selection of events to be recorded or counted. Selection of allowable combination of events causes the counters to operate concurrently. The monitor mode control registers may include bit fields for enabling the counters, controlling interrupts, selecting the event to be counted, and for freezing counter control. The number of events that can be selected for counting is implementation dependent. Other registers that may be used to support the performance monitor are the sampled instruction address register (SIAR) and the sampled data address register (SDAR). The SIAR stores the effective address of an instruction being sampled while the SDAR stores the effective address of the operand of the instruction whose effective address is stored in the SIAR.

The present invention uses the performance monitoring capability to optimize an application program by (1) profiling the program to identify the effective addresses in segments of object code that result in long table walks or long cache misses; (2) analyzing the results of the profiling operation to determine where to insert instructions into the object code that minimizes delays caused by long table walks or long cache misses; and (3) inserting instructions into the object code that minimize the effects of long table walks and long cache misses by preloading or "touching" an instruction or data. The optimizing program may make changes to the object code in real time or may save the program changes in an optimized change file. This change file may be stored on the local machine for direct updating, may be stored on a server for downloading to specific processors, or may be provided to a linker/loader program for optimizing during the compilation process.

In an embodiment of the present invention, an adaptive method for minimizing the effect of long cache misses in a processing system comprises initializing a performance monitor for monitoring cache misses, profiling an application program by using the performance monitor to collect cache miss data, building effective address tables from the cache miss data to associate effective addresses of offending instructions that create long cache misses with the cache misses of long duration, optimizing the application program by determining where to position preload instructions in an instruction sequence of the application program object code prior to effective address positions of the offending instructions that create long cache misses, building an optimized change file from the determination of the positions of the preload instructions in the instruction sequence, applying the optimized change file to the object code of the application program, testing the optimized object code for minimized long cache misses, and repeating the previous steps if long cache misses are not minimized. The step of initializing a performance monitor for monitoring cache misses may comprise setting bit configurations in control fields in a primary monitor mode control register for controlling a first performance monitor counter and a thresholder.

Alternatively, the step of initializing a performance monitor for monitoring cache misses may comprise setting bit configurations in control fields in a primary monitor mode control register and a secondary monitor mode control register for controlling a plurality of performance monitor counters and a thresholder. The step of profiling an application program by using the performance monitor to collect cache miss data may comprise counting a predetermined number of cache misses that exceed a threshold time interval value in a first performance monitor counter, signaling an interrupt when a most significant bit in the first performance monitor counter transitions from a logical 0 to a logical 1, loading an effective address of an executing instruction into a sampled instruction address register when the interrupt is signaled, and loading an effective address of an operand of the executing instruction into a sampled data address register when the interrupt is signaled. The step of profiling an application program by using the performance monitor to collect cache miss data may further comprise executing an interrupt handling routine on the interrupt signaled by the first performance monitor counter, the interrupt handling routine causing the contents of the sampled instruction address register and the contents of the sampled data address register to be copied into tables in memory. The step of building effective address tables from the cache miss data to associate effective addresses of offending instructions that create long cache misses with the cache misses of long duration may comprise examining the collected cache miss data, determining the number of occurrences of cache misses that exceeded a predetermined threshold value resulting from an instruction at a saved effective address, and selecting the saved effective addresses with the largest number of cache miss occurrences for storing in effective address tables. The step of optimizing the application program by determining where to position preload instructions in the instruction sequence of the application program object code prior to the effective address positions of the offending instructions that create long cache misses may comprise determining if an average number of instructions per subroutine in a set of nested subroutines is known, setting a midpoint subroutine equal to a threshold time interval value used for counting long cache misses divided by a product of a number of cycles per instruction and an average number of instructions per subroutine if the average number of instructions per subroutine is known, setting the midpoint subroutine equal to a midpoint of a first subroutine and a last subroutine in the set of nested subroutines if the average number of instructions per subroutine is not known, setting an instruction address breakpoint register to signal a first interrupt during execution of the midpoint subroutine, inserting a preload instruction in the midpoint subroutine where the first interrupt is signaled, setting an instruction address breakpoint register to signal a second interrupt after the first interrupt and during execution of the last subroutine at an address of an offending instruction that created a long cache miss, determining a number of instructions and a time interval between the first interrupt and the second interrupt using performance monitor counters, determining if the time interval between the first interrupt and the second interrupt is less than the threshold time interval value or greater than twice the time interval value used for counting long cache misses, setting the midpoint subroutine to equal the midpoint between the first subroutine and the midpoint subroutine in the step of setting an instruction address breakpoint register to signal a first interrupt and repeating the steps of setting an instruction address breakpoint register to signal a first interrupt through the step of determining the number of instructions and a time interval between the first interrupt and the second interrupt if the time interval between the first interrupt and the second interrupt is less than the threshold time interval value, and setting the midpoint subroutine to equal the midpoint between the last subroutine and the midpoint subroutine in the step of setting an instruction address breakpoint register to signal a first interrupt and repeating the steps of setting an instruction address breakpoint register to signal a first interrupt through the step of determining the number of instructions and a time interval between the first interrupt and the second interrupt if the time interval between the first interrupt and the second interrupt is greater than twice the threshold time interval value. Alternatively, the step of optimizing the application program by determining where to position preload instructions in the instruction sequence of the application program object code prior to the effective address positions of the offending instructions that create long cache misses may comprise determining an effective address of one of the offending instructions in the instruction sequence before which a preload instruction is to be placed, single stepping through instructions prior to the offending instruction so that a trace of an instruction sequence prior to the offending instruction is created, determining a number of instructions prior to the offending instruction for inserting a preload instruction in the instruction sequence using a predetermined average instruction time and the trace of the instruction sequence, and determining the effective address of the preload instruction prior to the effective address of the offending instruction in the instruction sequence so that the long cache miss is completed prior to the execution of the offending instruction. The step of building an optimized change file from the determination of the positions of the preload instructions in the instruction sequence may comprise creating tables in a memory that contain effective addresses of the preload instructions and the associated preload instructions that, when applied to an application program, minimize the effect of long cache misses. The step of applying the optimized change file to the object code of the application program may comprise inserting the optimized change file into the object code in real time. Alternatively, the step of applying the optimized change file to the object code of the application program may comprise storing the optimized change file in the resident processing system for patching the application program off-line. Another alternative includes uploading the optimized change file to a server processing system for subsequent downloading to specific client processing systems. Another alternative is exporting the optimized change file for use in recompiling the application program.

Another embodiment of the invention is a system for minimizing the effect of long cache misses in a processing system that comprises means for initializing a performance monitor for monitoring cache misses, means for profiling an application program by using the performance monitor to collect cache miss data, means for building effective address tables from the cache miss data to associate effective addresses of offending instructions that create long cache misses with the cache misses of long duration, means for optimizing the application program by determining where to position preload instructions in an instruction sequence of the application program object code prior to effective address positions of the offending instructions that create long cache misses, means for building an optimized change file from the determination of the positions of the preload instructions in the instruction sequence, means for applying the optimized change file to the object code of the application program, means for testing the optimized object code for minimized long cache misses, and means for repeating the previous steps if long cache misses are not minimized.

Another embodiment of the invention is a computer-programmed method for minimizing the effect of long cache misses, comprising the steps of initializing computer programmable performance monitor hardware for monitoring cache misses, profiling an application program by using the performance monitor hardware to collect cache miss data, building effective address tables in computer memory from the cache miss data to associate effective addresses of offending instruction that create long cache misses with the cache misses of long duration, optimizing the application program by determining where to position preload instructions in the instruction sequence of the application program object code prior to the effective address positions of the offending instructions that create long cache misses, building an optimized change file in computer memory from the determination of the positions of the preload instructions in the instruction sequence, applying the optimized change file to the object code of the application program, testing the optimized object code for minimized long cache misses, and repeating the previous steps if long cache misses are not minimized. The step of applying the optimized change file to the object code of the application program may comprise inserting the optimized change file into the object code in real-time.

BRIEF DESCRIPTION OF THE DRAWINGS

FIG. 3A and FIG. 3B show the bit field configurations for monitor mode control registers, MMCR0 and MMCR1.

FIG. 8 depicts the steps for building effective address tables.

FIG. 9 depicts one embodiment for optimizing effective address positions.

FIG. 11 illustrates an optimized change file in memory.

DETAILED DESCRIPTION OF THE PREFERRED EMBODIMENT

The present invention relates to optimizing the performance of a superscalar pipelined digital processor, or an equivalent thereof, capable of executing multiple instructions in a single instruction cycle. Performance monitoring hardware that is controlled by a software profiling program enables the processor to collect profile data, based on user input, during a number of application program operations to determine where delays are occurring in the processing of the application program. Where the delays occur are identified by the addresses of the instructions or data that caused the delays. The delays could be caused by a number of different conditions, including long cache misses and long table walks, and could result in the occurrence of stalls or idles in one or more of the execution units of the digital processor. The delays that have the most significant penalty to the processing operations are identified by the effective address of the offending instructions. An optimizing program then attempts to avoid or minimize the delays associated with the most significant penalties by determining where to preload or touch the addresses of the instructions or data that cause the delays. This is done far enough in advance of the required execution to have completed the preload operation when the execution of the instruction or data access is required. This ensures that the translation look-aside buffers (TLBs) are updated or that the cache is loaded from memory to minimize the effects of delays due to long cache misses or long table walks. This process can be repeated for a number of iterations to arrive at an optimum placement of the preload or touch instruction. The optimizing program then either inserts changes to the object code in real-time, or creates an optimized change file that identifies object code changes for the processing program for machine specific optimized performance. This optimized change file can then be used to update the object code of the processing program later, can be stored on a server for subsequent downloading to a processing program, or can be provided to a linker/loader program when recompiling the processing program.

FIG. 1 through FIG. 13 provide an exemplary embodiment of the present invention that illustrates some of its novel and useful features. The following provides a description of the digital processor and performance monitoring hardware environment, followed by a description of how long table walks and long cache misses can occur in an instruction cycle. The profiling and optimizing processes are described. Embodiments of how the performance monitoring hardware may be used by a software profiling program to collect profile data relating to long table walks and long cache misses are presented. And finally, embodiments of the optimizing process are described and methods to implement changes to the instruction sequence are illustrated.

Figure 1:
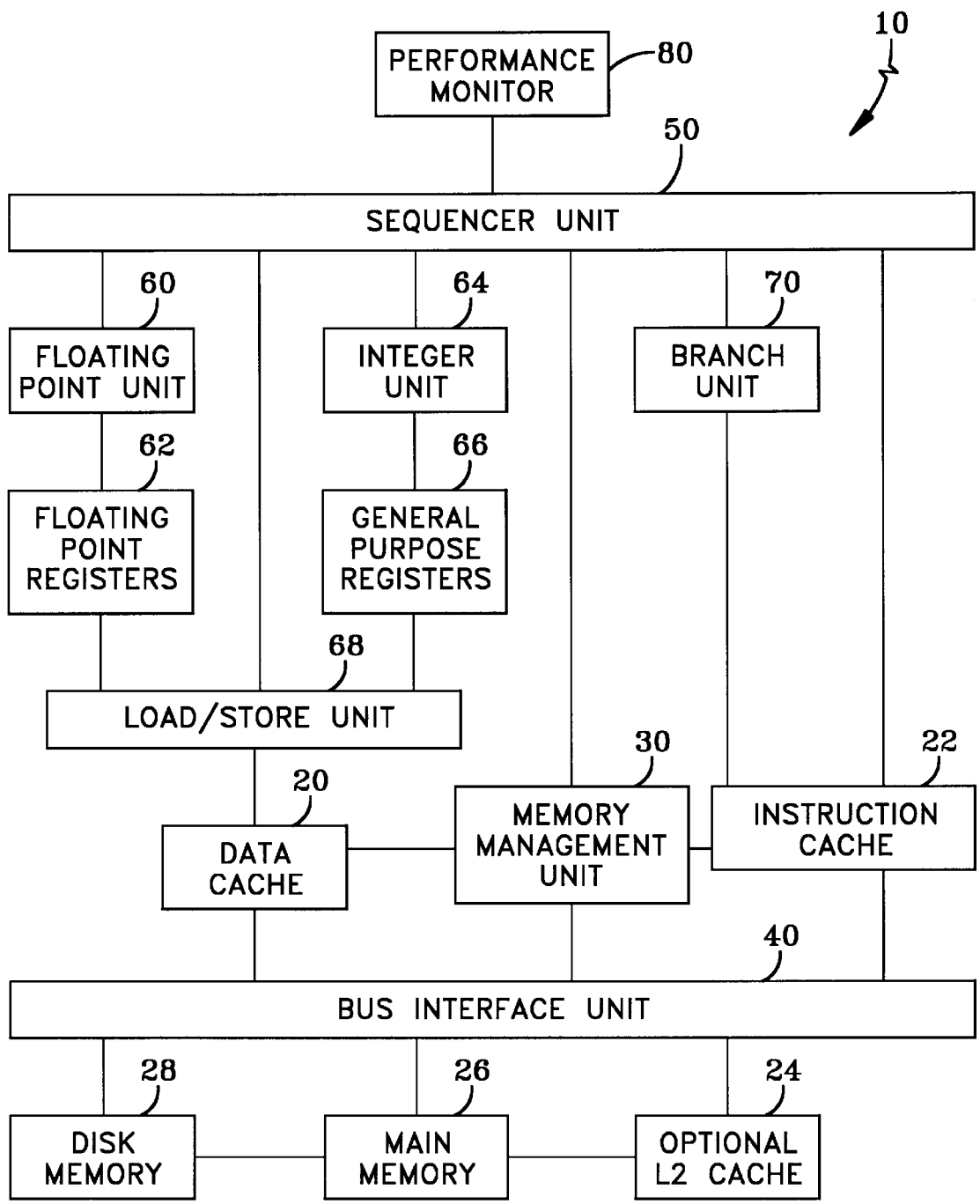
FIG. 1 is a representative block diagram of the digital processor hardware architecture according to the preferred embodiment of the present invention.

FIG. 1 is a representative block diagram of the digital processor hardware architecture according to the preferred embodiment of the present invention. The digital processor is a superscalar pipelined digital processor, or equivalent, capable of executing multiple instructions in a single instruction cycle, such as the PowerPC™ RISC processor produced by IBM Corporation. The processor 10 is composed of a memory hierarchy that includes a data cache 20 and an instruction cache 22, an optional L2 cache 24, a main memory 26, and a disk memory 28. The optional L2 cache 24, the main memory 26, and the disk memory 28 are accessed via the bus interface unit 40. The memory hierarchy is controlled by the memory management unit 30. The memory hierarchy is created for economic reasons, since the faster memory units are more costly, based on the cost per stored byte, than the slower memory units. The data cache 20 and the instruction cache 22 have faster access times and are more costly than the optional L2 cache 24. The optional L2 cache 24 has faster access times and is more costly than the main memory 26. The main memory 26 has faster access times and is more costly than the disk memory 28. The processor 10 also has a sequencer unit 50 that receives instructions from the instruction cache 22, decodes the instructions, dispatches the appropriate commands to the processor execution units, and is notified of execution completion by the execution units. The processor execution units controlled by the sequencer unit 50 include the floating point unit 60, the floating point registers and rename buffers 62, the integer unit 64, the general purpose registers and rename buffers 66, the load/store unit 68, the branch unit 70, the memory management unit 30, the instruction cache 22, and the performance monitor 80. It should be noted that high performance is achieved by executing multiple instructions in a parallel manner by the sequencer unit 50 and the various execution units at any point in time during execution of a processing program by the processor. An instruction cycle consists of the steps of fetching the instruction, decoding the instruction, dispatching the decoded commands to the appropriate execution units, executing the instruction, and completing the instruction. The commands are dispatched in the order of the programmed sequence. However, some instructions, such as complex arithmetic operations, require more than one instruction cycle for completion. This can be a problem in the case where the results of a first instruction are required for the execution of a second instruction, and the first instruction requires a long time (multiple instruction cycles) to complete because of a long table walk or a long cache miss.

In the present invention, this problem is solved by enabling operation of the processor whereby the programmed sequence of instructions may be altered to insert a preload instruction in the instruction sequence prior to the offending instruction that caused the long table walk or long cache miss. The preloaded instruction, referred to as a touch instruction, causes the TLBs or cache to be preloaded prior to the execution of the offending instruction. The preload or touch instruction is executed earlier with respect to the offending instruction, to ensure that it is completed and its results are available when needed by the offending instruction, eliminating or reducing unnecessary delay in the subsequent processing program execution. The operation is shown and discussed in detail in the following paragraphs and FIG. 5 through FIG. 7.

Figure 2:
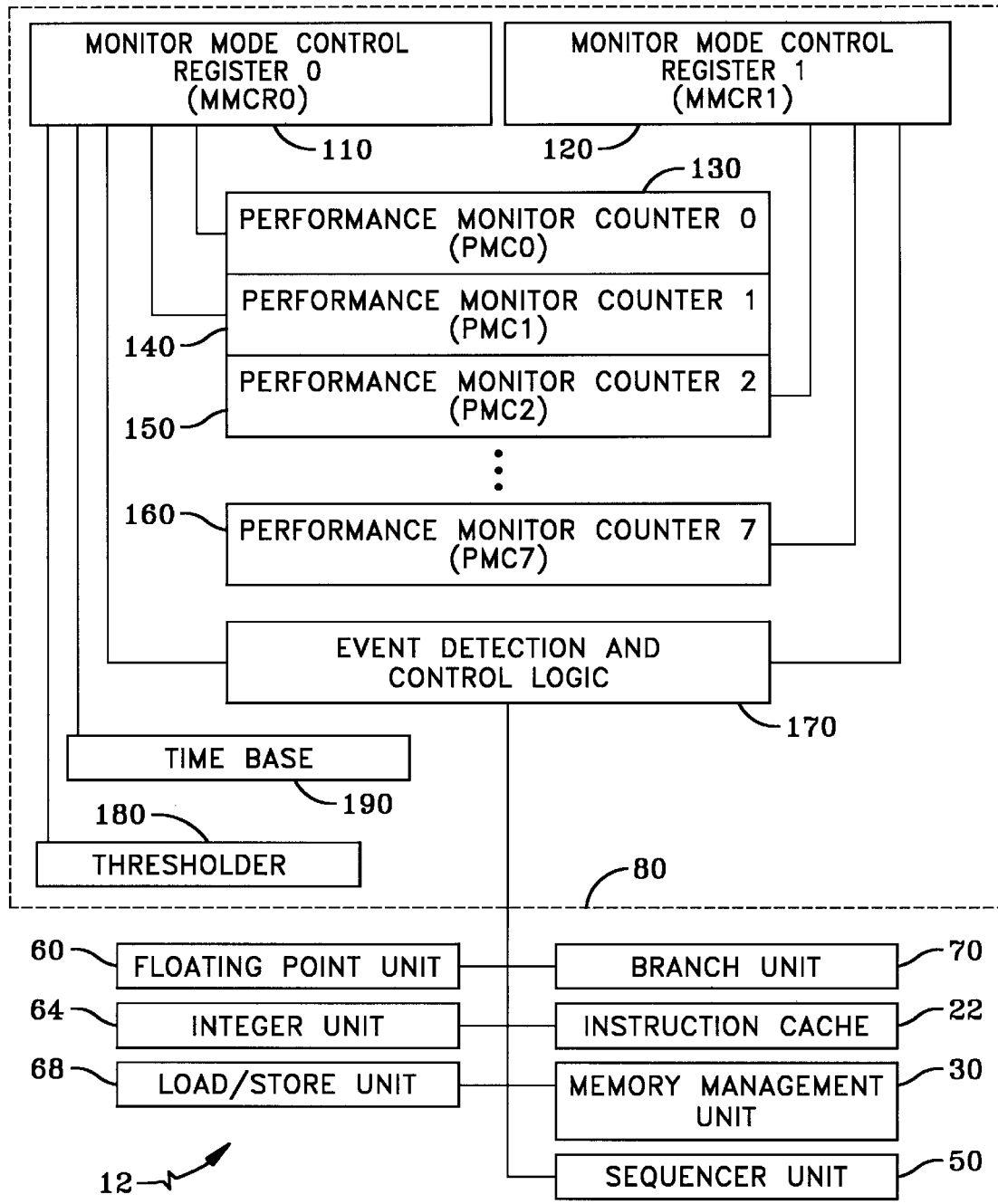
FIG. 2 depicts the relationship between the processor execution units and the performance monitor.

Turning now to FIG. 2, FIG. 2 depicts the relationship between the processor execution units shown in FIG. 1 and the performance monitor. The processor 12 shown in FIG. 2 comprises the execution units and the performance monitor 80 shown in FIG. 1. The execution units shown in FIG. 2 include the instruction cache 22, the memory management unit 30, the sequencer unit 50, the branch unit 70, the floating point unit 60, the integer unit 64, and the load/store unit 68. The performance monitor 80 has, typically, two monitor mode control registers, MMCR0 110 and MMCR1 120. It also has special purpose registers (SPRs) that are used as performance monitoring counters: PMC0 130, PMC1 140, PMC2 150, through PMC7 160. The monitor mode control registers and the performance monitor counters are normally 32 bit in length, but may be any reasonable length. The events to be monitored by the performance monitor 80 are selected by the event detection and control logic 170 under control of MMCR0 110 and MMCR1 120. An accurate time base 190, and a thresholder 180 that may be loaded from a control field of MMCR0 110 are also depicted. The events to be monitored by the performance monitor 80 are implementation dependent and may be performance parameters such as the number of execution unit stalls and duration, execution unit idle time, memory access time, etc. The monitor mode control registers MMCR0 110 and MMCR1 120 control the operation of the performance monitor counters PMC0 130, PMC1 140, PMC2 150, through PMC7 160. FIG. 3 illustrates a typical configuration of MMCR0 110 and MMCR1 120 for control of PMC0 130, PMC1 140, PMC2 150, through PMC7 160.

The performance monitor registers MMCR0, MMCR1, and PMC0–PMC7 are capable of being read from and written to under control of a software program. As illustrated in FIG. 3A and FIG. 3B, MMCR0 110 controls the operation of PMC0 and PMC1 while MMCR1 120 controls the operation of PMC2 through PMC7. MMCR0 110 and MMCR1 120 are configured into a number of control fields that control events to be counted, enable performance monitoring interrupts and control condition to enable counting. Bits 0–4 and 18 of MMCR0 110 enables counting by PMC0 and PMC1. Bits 5, 16, and 17 of MMCR0 110 control interrupts generated by PMC0 and PMC1. When enabled, interrupts are generated when the most significant bit of the selected counter transitions from a logical 0 to a logical 1. Typically, when an interrupt is generated, the state of processor registers is saved as well as the effective address of the executing instruction. Upon an interrupt, the effective address of the executing instruction and the executing instruction operand are saved in the sampled instruction address register, SIAR, and the sampled data address register, SDAR, respectively. The state of the execution units is also saved on interrupt. Bits 6–9 of MMCR0 110 control the time or event based transitions. Bits 10–15 of MMCR0 110 are used to store a software selectable threshold value (X), which enables a count when the threshold value is exceeded. The threshold value is exceeded when a decrementer with an initial value that equals the threshold value reaches zero before a selected event is completed. The threshold value is not exceeded when the selected event is completed before the decrementer, having an initial value that equals the threshold value, reaches zero. Bits 19–25 of MMCR0 110 are used to select the events to be monitored by PMC0 and bits 26–31 of MMCR0 110 are used to select the events to be monitored by PMC1. Similarly, MMCR1 120 bits 0–4 control the event selection for PMC2, bits 5–9 control event selection for PMC3, bits 10–14 control event selection for PMC4, bits 15–19 control event selection for PMC5, bits 20–24 control event selection for PMC6, and bits 25–28 control event selection for PMC7. There may be less than or more than eight performance monitor counters. The number of performance monitor counters is implementation dependent. MMCR1 120 bit 29 freezes counting until an IABR (instruction address breakpoint register) match occurs, FCUIABR. When a match occurs between the instruction address and the value in the instruction address breakpoint register IABR, MMCR1 120 bit 29 is reset to zero and counting is enabled, if allowed by MMCR0 110 bits 0–4 and the machine state register MSR bit 29, PM. MMCR1 120 bits 30 and 31 control the updating mode of the performance monitor counters PMC0–PMC7. When MMCR1 120 bit 30 is a logical zero, PMC0 is in the normal counting mode. In the counting mode, the number of times that a selected event occurs is counted. When MMCR1 120 bit 30 is a logical one, PMC0 is in the history mode. In the history mode, time-ordered relationships between selected events can be analyzed to determine system performance. When MMCR1 120 bit 31 is a logical zero, PMC1–PMC7 are in the normal counting mode. When MMCR1 120 bit 31 is a logical one, PMC1–PMC7 are in the history mode.

Figure 4:
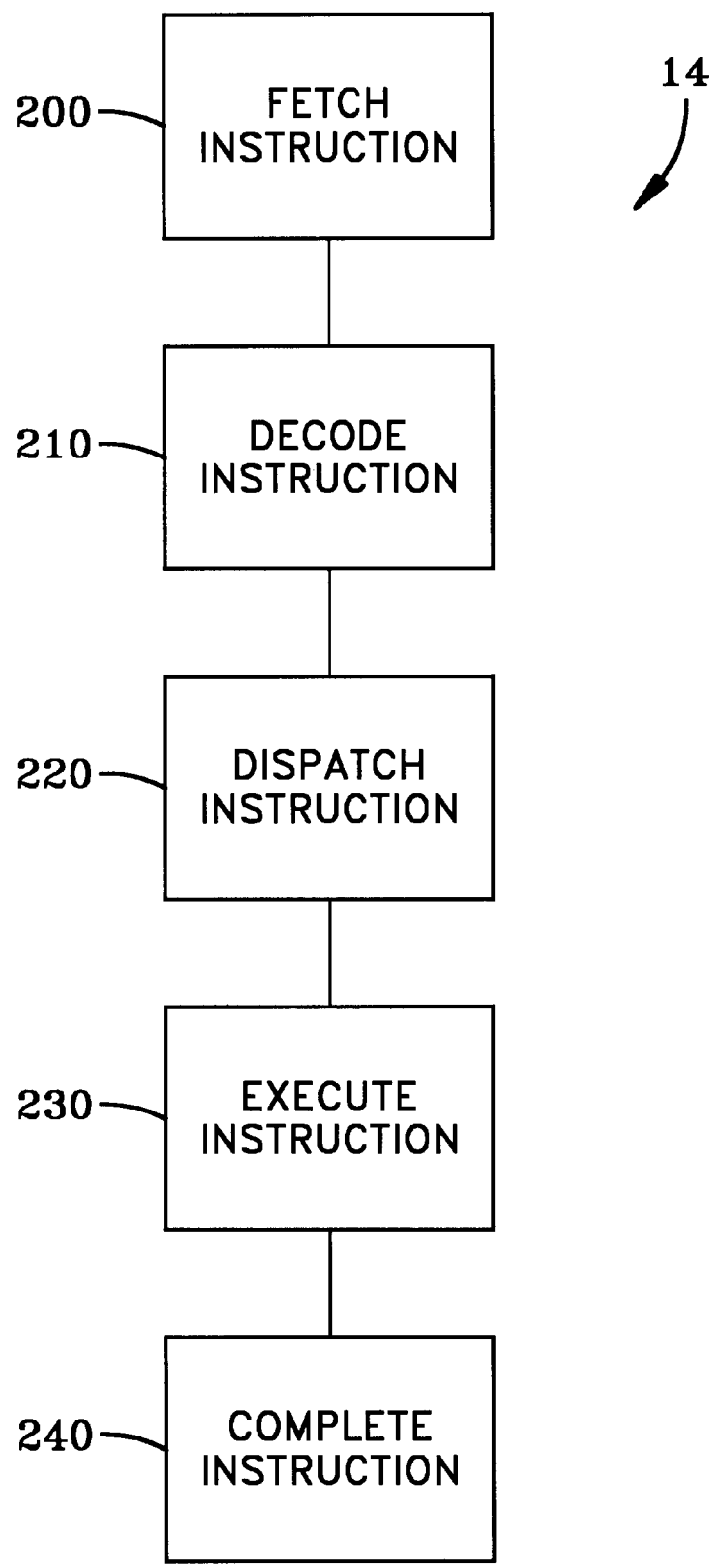
FIG. 4 depicts the five steps of an instruction cycle.

Turning now to FIG. 4, FIG. 4 depicts the five steps of an instruction cycle 14. These steps illustrate how delays due to long cache misses or long table walks can occur. The first step is instruction fetch 200 performed by the sequencer unit, 50 in FIG. 1. A table walk can occur at this step if the physical address of the instruction cannot be determined through use of the on-chip translation look-aside buffers (TLBs). An instruction cache miss can also occur at this step if the instruction is not available in the instruction cache. Normally, the instruction will be found in the instruction cache, 22 in FIG. 1. The desired instruction is then fetched by the sequencer unit where the instruction is decoded in the decode instruction step 210 and dispatched in the dispatch step 220 to the appropriate execution unit. If, for example, the execution unit where the instruction is dispatched is the load/store unit because data is required for an arithmetic operation, the load/store unit, 68 in FIG. 1, is called upon to access the required data. The load/store first calculates an effective address of the data and then attempts to determine the physical address of the data by using the TLBs. A table walk can occur at this step if the physical address of the data cannot be determined through use of the on-chip translation look-aside buffers. A data cache miss can also occur at this step if the data is not available in the data cache, 20 in FIG. 1. If a table walk occurs, the memory management unit, 30 in FIG. 1, is called upon to determine the desired physical address from the effective address by accessing translation tables in main memory, 26 in FIG. 1, or on disk memory, 28 in FIG. 1. Once the physical address is determined, the block of main memory containing the physical address of the desired instruction or data can be loaded into the TLBs. If an instruction cache miss or a data cache miss has occurred, the required instruction or data must be loaded from main memory or disk memory into the appropriate cache. This illustrates how long cache misses and long table walks can cause delays during instruction execution. When the instruction or data is available, the corresponding instruction is executed 230 and the instruction sequence is completed 240.

Figure 5:
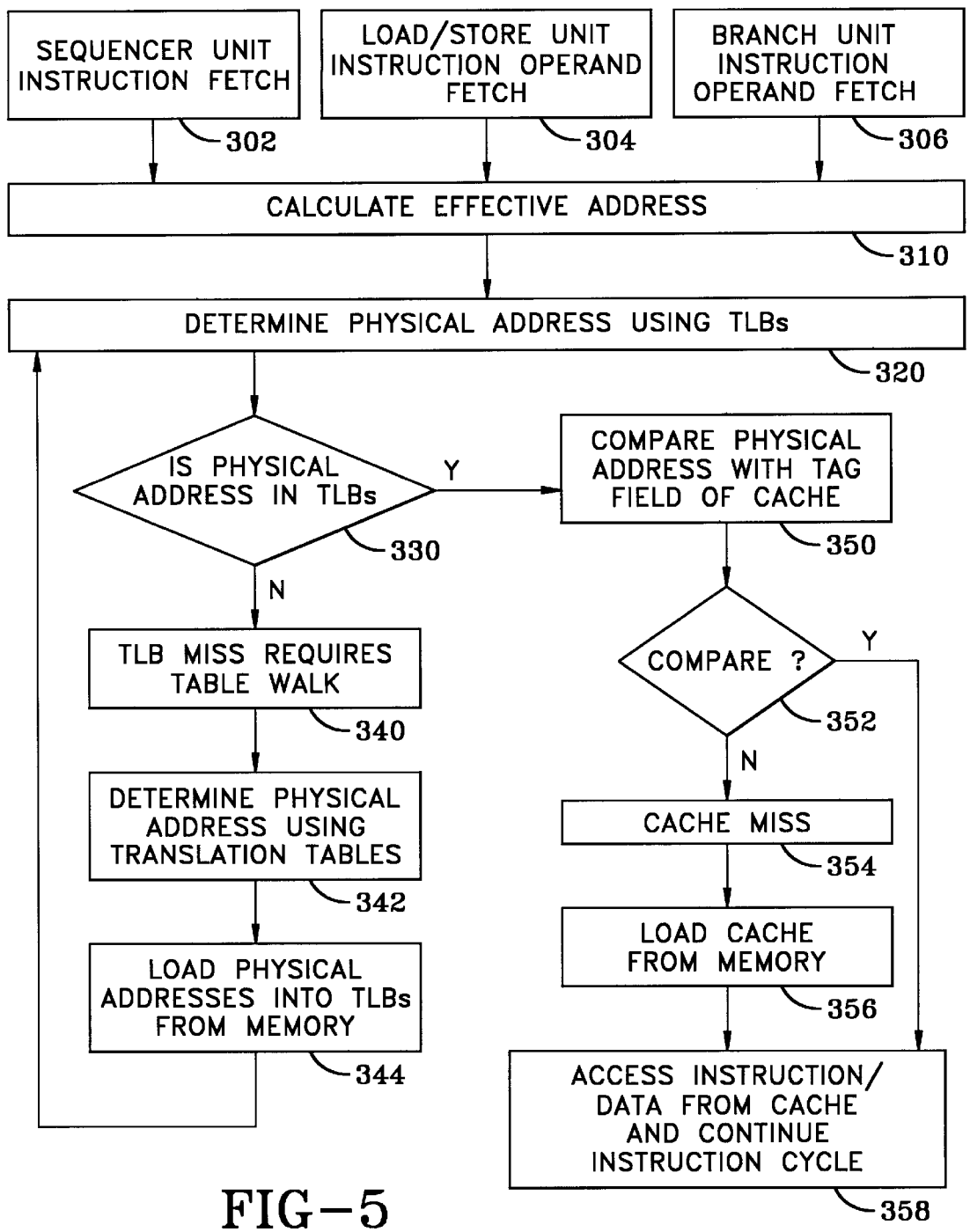
FIG. 5 depicts the logical flow of processing effective addresses when a physical address cannot be found in the translation look-aside buffers (table walk) or the physical address does not compare with the tag field of the cache (cache miss).

FIG. 5 depicts the logical flow 16 of processing effective addresses when a physical address cannot be found in the translation look-aside buffers (table walk) or the physical address does not compare with the tag field of the cache (cache miss). As shown in FIG. 5, an effective address of an instruction may be calculated 310 by either the sequencer unit 302 or the branch unit 306. An effective address of data may be calculated 310 by the load/store unit 304. Once an effective address is calculated 310, the on-chip TLBs are used to determine the corresponding physical address 320. If the physical address is not found by using the TLBs 330, a TLB miss has occurred and a table walk is required 340. The memory management unit is called upon to determine the required physical address from the effective address using translation tables 342 in main memory or disk memory. When the physical address is determined, a block of physical addresses containing the desired physical address is loaded into the TLBs from memory 344. As denoted in FIG. 5, if the required physical address is determined through use of the TLBs 330, the upper order bits in the physical address are compared with the tag bit field in either the instruction cache or data cache 350, depending upon whether an instruction or data is being accessed. If the upper order bits compare with the tag bit field in the cache 352, the data or instruction is available in cache, the instruction or data is accessed from the cache and the instruction cycle is completed 358. If the upper order bits of the physical address do not compare with the tag bit field in the cache 352, a cache miss has occurred 354, indicating that the required instruction or data is not available in the cache. The cache must then be loaded from main memory 346, enabling access to the required instruction or data and continuation of the instruction cycle. If the required data or instruction address is not in main memory, but is on the disk, a block of memory addresses must first be loaded from disk into main memory before the data or instruction cache may be loaded or stored from main memory. The instruction or data is then accessed from the cache and the instruction cycle is completed 358.

Figure 6:
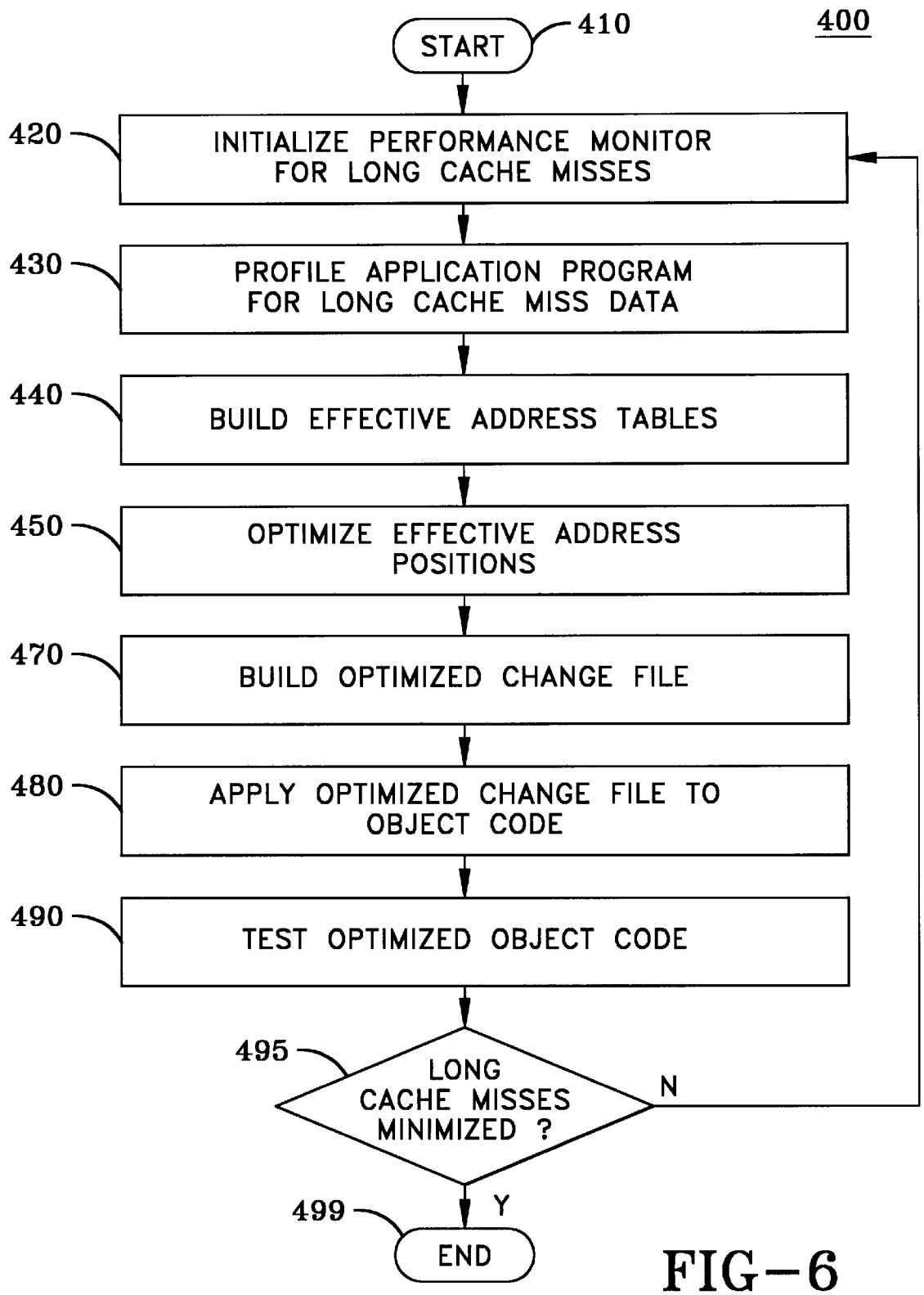
FIG. 6 shows a high level flow chart illustrating operation of the preferred embodiment of the present invention.

FIG. 6 shows a high level flow chart 400 illustrating the preferred embodiment of the present invention. After the process is started 410, the next step is to initialize the performance monitor 420 to characterize long cache misses, described and shown in more detail in FIG. 7.

Figure 7:
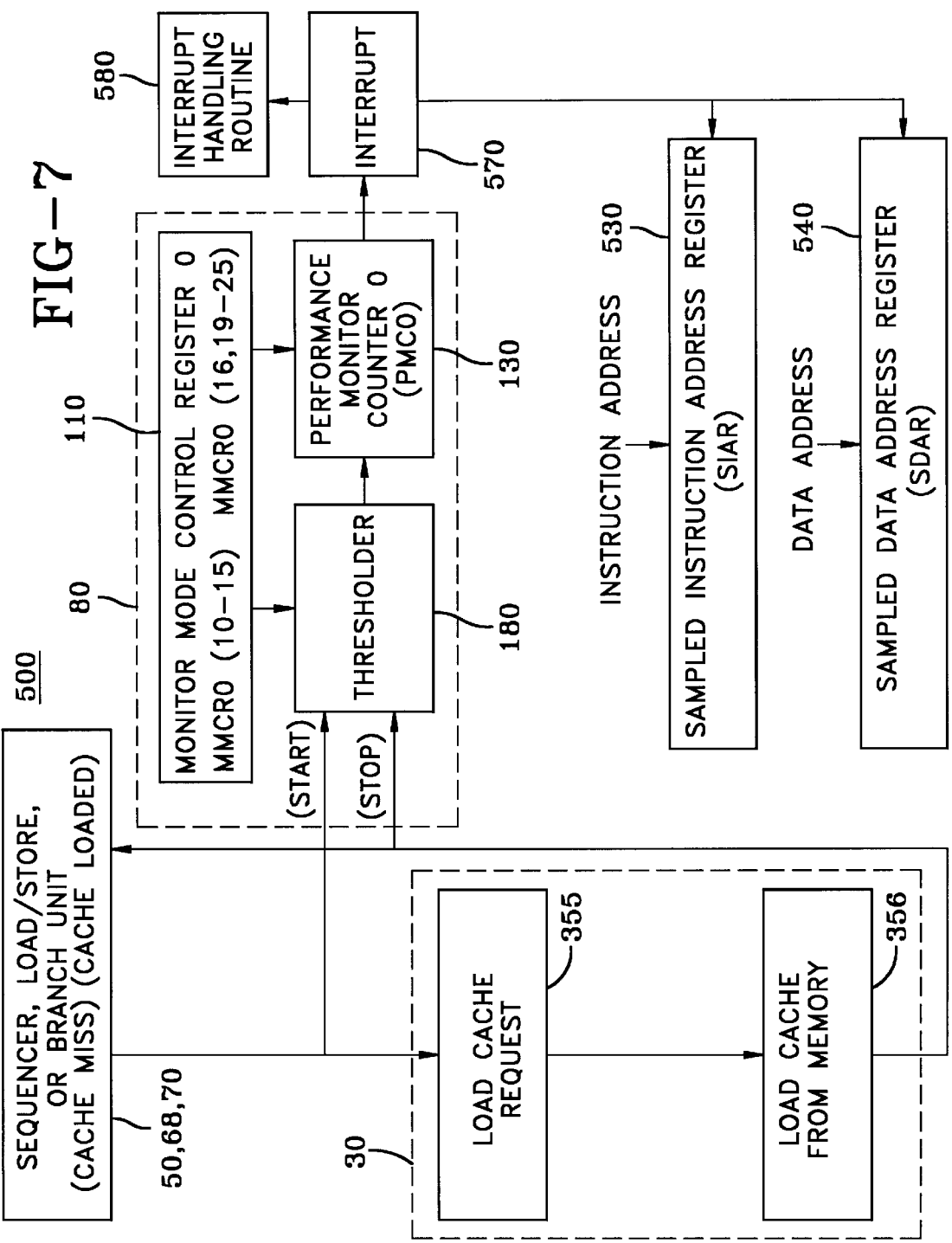
FIG. 7 depicts the operation of the Performance Monitor and related hardware for profiling an application program to characterize cache miss data.

For an example of the initialization of the performance monitor, step 420 in FIG. 6, refer to FIG. 3A and FIG. 7. Referring to FIG. 3A and FIG. 7, bit 4 (FCPM0) of monitor mode control register 0 (MMCR0) 110 is set to enable the performance monitor 80 when the PMM bit of the machine state register (MSR) is set by the operating system. This occurs when the program to be profiled is called by the operating system, enabling the performance monitor 80. Bit 5 of MMCR0 is set to enable interrupts by the performance monitor 80. A threshold value is set into MMCR0 bits 10–15 that enables performance monitor counter 0 (PMC0) 130 to count when the time for the selected event exceeds the threshold value applied to the thresholder 180. Bit 16 of MMCR0 110 is set to a logical 0 to enable interrupts from PMC0 130. Bits 19–25 (PMC0 event selection) of MMCR0 110 are selected to enable PMC0 130 to count long cache misses. PMC0 130 is incremented when the cache miss time interval exceeds the threshold time interval valuer specified in bits 10–15 of MMCR0 110.

FIG. 7 depicts the operation of the performance monitor 80 and related hardware for profiling an application program, step 430 of FIG. 6. FIG. 7 shows the logic flow of the memory management unit 30 in relation to the sequencer unit 50 or the load/store unit 68 or the branch unit 70, the performance monitor 80, and the sampled instruction address register (SIAR) 530 and the sampled data address register (SDAR) 540 for characterizing long cache misses 500. When a data or instruction cache miss has occurred, the sequencer unit 50, the load/store unit 68, or the branch unit 70 generates an effective address and sends load cache request 355 to the memory management unit 30. The memory management unit 30 then loads the cache from memory 356. By selecting bits 19–25 of MMCR0 110, PMC0 130 is enabled to increment when a cache miss is started and a threshold value, determined by bits 10–15 of MMCR0 110 and a thresholder 180, is exceeded. In the preferred embodiment, PMC0 130 would be programmed to signal an interrupt 570 when a predetermined number of long cache miss occurrences is exceeded. For example, PMC0 130 could be programmed to signal an interrupt 570 when 1000 occurrences of a long cache miss that exceeded a specific threshold value of time, as determined by bit 10–15 of MMCR0 110 and the thresholder 180, have occurred. When the interrupt 570 is signaled, the effective address of the instruction being executed is saved in the sampled instruction address register (SIAR) 530 and the effective address of its operand is saved in the sampled data address register (SDAR) 540. When the interrupt is serviced by the interrupt handling routine 580, the profiling program, step 430 of FIG. 6, copies the contents of the SIAR 530 and the SDAR 540 into tables in main memory. The number of occurrences of the event being monitored and the length of time for the event may be adjusted as system parameters. It is important that the number of occurrences be large enough to allow the system and the application program being profiled to achieve a normal mode of operation before the next interrupt occurs. That is, the effect on the application under test of the signaling and handling interrupts should be minimized. The adjustment of these parameters may be done by a predetermined "trial and adjust approach." For example, given a maximum threshold and a minimum threshold, which may be zero, one can use an approach that adjusts the threshold until the number of interrupts average around one every fifty milliseconds. In the preferred embodiment, only one application program would be monitored at one time. This is done by using the PMM bit in the MSR and programming the performance monitor 80 to only count when the PMM bit is set. The program being monitored would have the PMM bit set as part of its process context, which is restored by the operating system thread switching logic whenever the program is dispatched.

Turning back again to FIG. 6, after the performance monitor is initialized 420 and the application program is profiled 430 to collect cache miss data, as the data is being collected a background program builds effective address tables 440, sorting the data based on the effective addresses and the length of time of the long cache miss. As shown in FIG. 8, the step of building effective address tables comprises examining the cache miss data 442, determining the number of occurrences of long cache misses 444, and storing the effective addresses associated with the largest number of long cache misses in address tables 446. The software interrupt handler that services the performance monitor interrupt puts the contents of the SIAR and the SDAR in main memory as table entries. A background process, which is not being monitored, processes the data in the tables and communicates with the performance monitor interrupt handling software as to what data it has captured, so that it may overlay the old contents of the SIAR and SDAR pair in main memory with newly acquired data. An alternative approach is that the interrupt software simply logs the data in a round robin buffering approach and does not care if the monitoring process has processed the data before it is overwritten. A reasonably large buffer, one megabyte for example, would typically allow the monitoring software to copy the data before it is ever overwritten. In some systems, the buffer may be kept in "kernel space" and the monitoring software makes a system call which copies the previously unprocessed data from kernel space to the performance monitoring application space and adjusts pointers so that it knows what data to copy the next time. The described background process takes the information captured by the interrupt handler and determines the number of occurrences of each address contained in both the SIAR and the SDAR. One method for doing this would be to use a hash table for the addresses. Another approach would be to keep the addresses as sorted link lists. In the case of monitoring instruction cache misses that exceed a specified threshold, the address specified in the SAIR with the greatest number of occurrences is a prime candidate for insertion of a cache preload or touch instruction. In the case of monitoring data cache misses that exceed a specified threshold, the SDAR with the greatest number of addresses specified by the SDAR with the greatest number of occurrences is a prime candidate for insertion of a cache preload or touch instruction.

The next step in the process depicted in FIG. 6 is to run the optimizing program, step 450 of FIG. 6. In this step, the optimizing program analyzes the effective address tables from the previous step to determine where to position the preload or touch instructions to minimize the effects of the long cache misses. The problem of determining where to place the preload or touch instructions in the object code can only be done after some type of code path analysis has been performed. In some systems, the object code itself is subject to a static analysis, whereby basic blocks and calling sequences can be determined with enough effort, that is, reverse engineering. If the code is well behaved and does not modify other code, one can determine basic blocks and calling sequences. The advantage of this approach is that one can make this analysis before the test run is taking place. The disadvantage of this approach is that there may be multiple methods of entries to a path of code and there is no way to be sure which path(s) need to be modified. If the actual source code is available, the analysis of paths is simpler than with the object code, but the same problem exists. Another approach is to instrument the code and determine the paths lengths while the instrumented code is being run. Instrumenting the code should be done via a separate run, and not while the real time analysis and adjustment is taking place. One approach to instrumenting the code is to insert software calls at each entry, exit, and branch to determine code path. Another approach to determining code path is to use the single step mode to record the code path and operand addresses. That is, create a trace of the entire program or that of a subset under consideration. The analysis of this trace can be used to determine which code paths or instruction sequences are executed most often, which can then be used to determine where to place the preload or touch instructions in the object code. The preload or touch instruction needs to be placed a distance in advance of the offending instruction. That distance can be determined by the fact that the threshold identifies the minimum number of processor cycles in advance of the offending instruction where the preload or touch instruction should be placed. Conversion of processor cycles to the number of instructions to be executed can be converted by various methods, including simulation or simply using the average number of processor cycles per instruction. FIG. 9 depicts the steps for determining the position of a preload instruction using an analysis of the program trace. After determining the address of an offending instruction that results in a long cache miss 452, the processor is run in single step mode through the instructions prior to the execution of the offending instruction 453, creating a program trace. The insertion point for the preload instruction is then determined 454. The preload instruction should be positioned before the offending instruction by at least a time interval that is equivalent to the threshold value used to determine long cache misses. By using the number of processor cycles that is equivalent to the threshold value, and by using the average number of processor cycles per instruction, the number of instructions equivalent to the threshold value may be determined. In the case of a program without branches, the address of the preload instruction may be determined by subtracting this equivalent number of instructions from the address of the offending instruction 455.

Figure 10:
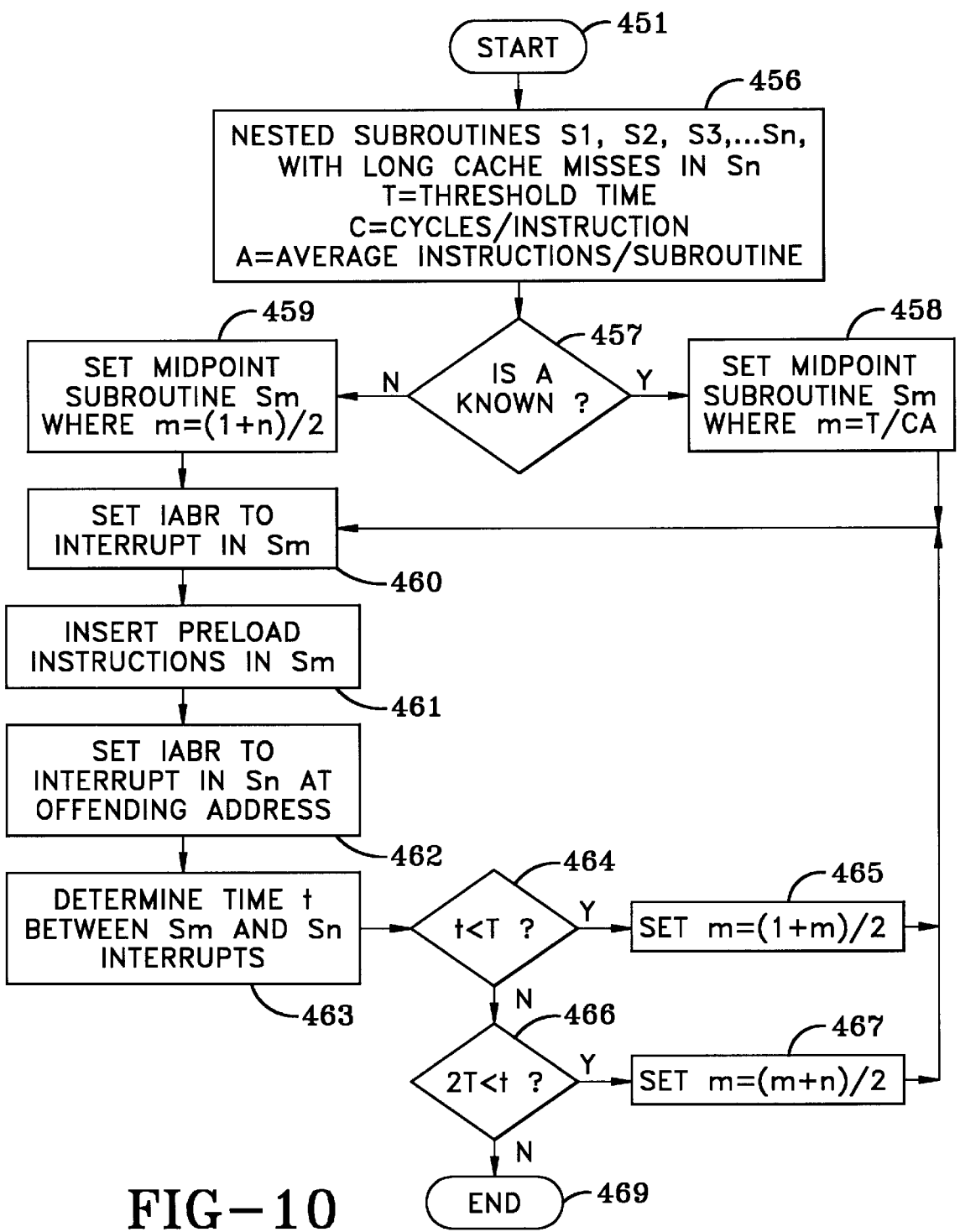
FIG. 10 shows another embodiment for optimizing effective address positions.

In the preferred embodiment of step 450 of FIG. 6, a "stack unwind" approach is used to determine the effective address of the preload instruction, and is depicted in FIG. 10. After determination of the effective address of the offending instruction in the code sequence before which the preload or touch instruction is to be placed, the system must enter an analysis mode, where the IABR is used to signal an interrupt when the specified address is accessed. When the IABR interrupt is generated, the stack for the process is available and the stack contains the addresses of the callers (for the purposes of being able to return to the caller, and to its caller, etc.). The IABR interrupt routine records the "stack unwind" information. The optimizer program captures this data and determines the most commonly executed paths. The optimizer may then determine the point of insertion of the preload or touch instruction from repeating the profiling program with the optimized changes inserted in the object code. In the case where the stack unwind approach is used to determine where to insert the preload or touch instructions, the following algorithm identifies an embodiment of the present invention for determining where to insert the preload or touch instruction for a given stack unwind Referring to FIG. 10, assume, for example, a set of nested subroutines, 456, where subroutine S1 calls subroutine S2, subroutine S2 calls subroutine S3, subroutine S3 calls subroutine S4, and so on until subroutine Sn is called. Subroutine Sn is where the long cache miss occurred, or where the offending instruction is located. The subroutine calling sequence is repeated a number of times during the execution of the application program. If the average number of instructions per subroutine call is known 457, then the starting point for inserting an initial preload or touch instruction into a subroutine Sm, may be estimated by using the number of cycles per instruction C, and the average number of instructions per subroutine call A. The value of m may be estimated by dividing the threshold value T by the product of the number of cycles per instruction C and the average number of instructions per subroutine call 458. The computed value of m is then rounded to equal a whole number. If the average number of instructions per subroutine call is not known 457, then a binary search algorithm may be used to determine where to insert the preload or touch instruction. In this case, one would insert the preload or touch instruction midway between the calling program S1 and the subroutine Sn, in subroutine Sm. The value of m may be estimated by dividing the sum of 1 and n by 2, 459. The computed value of m is then rounded to equal a whole number. In the analysis mode, the IABR is set to interrupt first at an instruction in subroutine Sm, 460, prior to the call to Sm+1. When the IABR interrupt is taken, a preload instruction is inserted into subroutine Sm, 461, and the IABR is set to interrupt second in Sn where the offending address is located, indicative of a long cache miss 462. During the analysis mode, the performance monitor counters are used to determine the number of instructions and the time between the first interrupt and the second interrupt 463. If the time is less than the threshold time T, 464, then a new midpoint is chosen between the calling program S1 and the current midpoint Sm 465 by setting new m equal to the sum of one plus previous m divided by two, and the steps of 460–463 are repeated. If the time between interrupts is greater than twice the threshold time T, 466, then a new midpoint is chosen between the current midpoint in subroutine Sm and the subroutine Sn 467 by setting new m equal to the sum of previous m plus n divided by two, and the steps of 460–463 are repeated. If the time between interrupts is less than or equal to twice the threshold time T but equal to or greater than the threshold time T, then the algorithm is completed 469.

Figure 13:
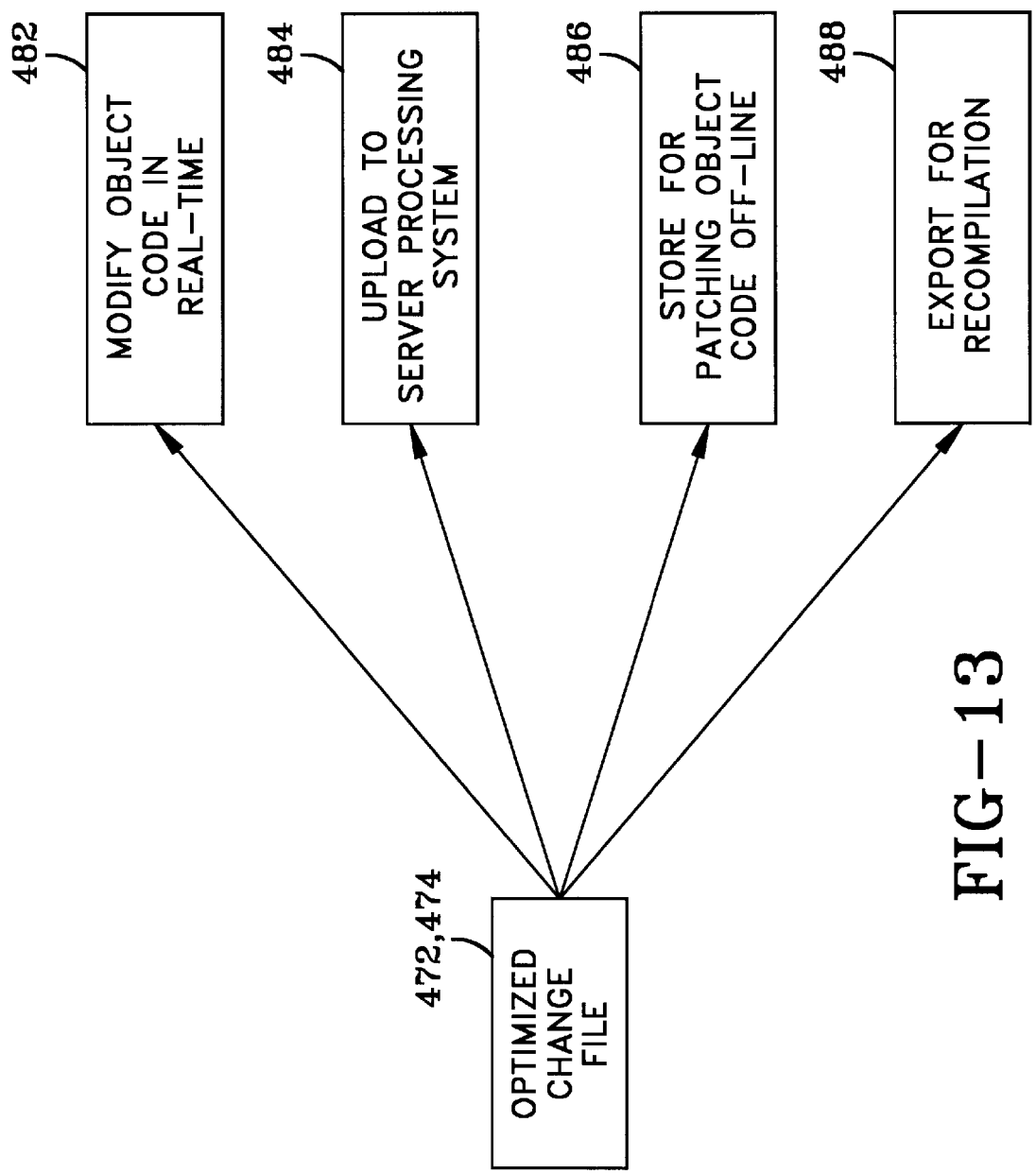
FIG. 13 shows alternative methods for integrating an optimized change file into the object code of an application program.

After the optimizing program step 450, an optimized change file is built in memory, step 470 in FIG. 6. An optimized change file is depicted in FIG. 11, showing effective addresses of the preload instructions 472 and the associated preload instruction 474. The next step 480 in FIG. 6 is to apply the optimized change file 472, 474 to the object code, as depicted in FIG. 13. This may be done in real-time 482 or stored for patching in an off-line manner at a later time 486. The optimized change file may also be uploaded to a server processing system 484 for subsequent downloading to specific client processing systems, or may be exported to a compiler for implementing the optimized changes during recompilation 488. After the optimized change file has been applied to the object code of the application program 480, the optimized object code is tested 490 by profiling the application program to determine if there still exist long cache misses. If there are no long cache misses 495, or the number of cache misses is within acceptable limits to be considered minimized, the process is then ended 499. If there still exist long cache misses 495 beyond acceptable limits to be considered not minimized, the process depicted in FIG. 6 is repeated in an iterative manner. The level of minimization may be set by selection of a sufficiently large threshold value in MMCR0 and by selecting allowable limits in the number of occurrences of long cache misses.

Figure 12C:
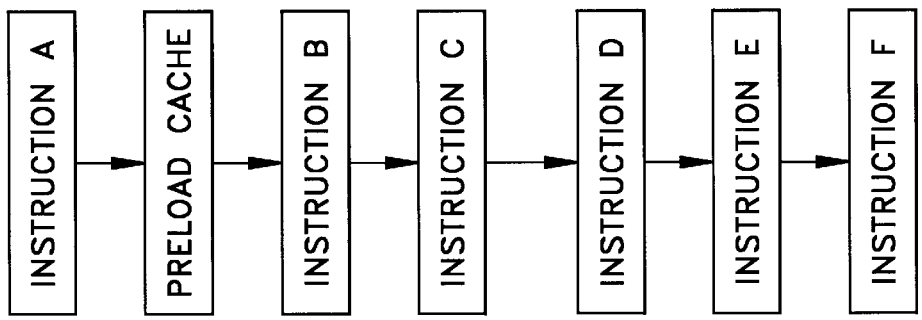
FIG. 12C depicts on off-line method of preloading the instruction or data to minimize the effect of long cache misses.
Figure 12B:
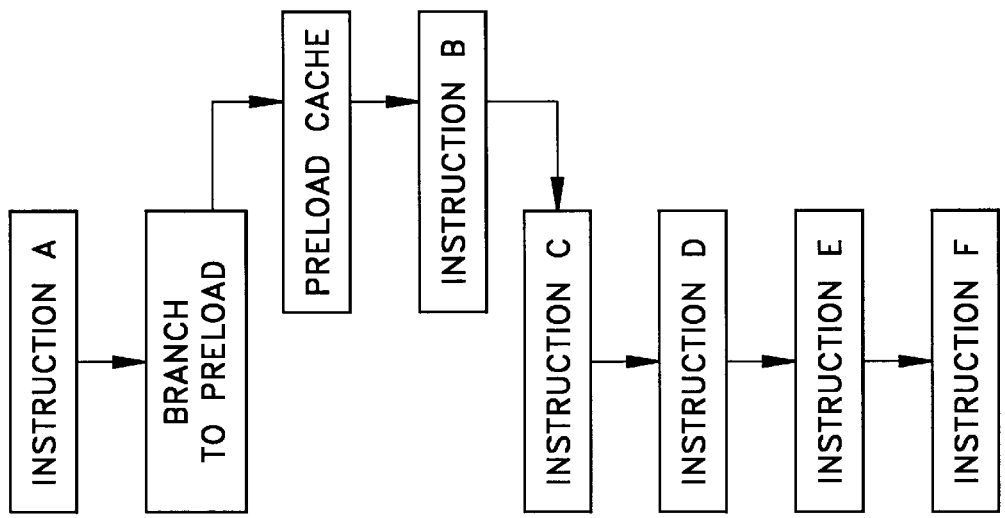
FIG. 12B depicts a real-time method of preloading the instruction or data cache to minimize the effect of long cache misses.
Figure 12A:
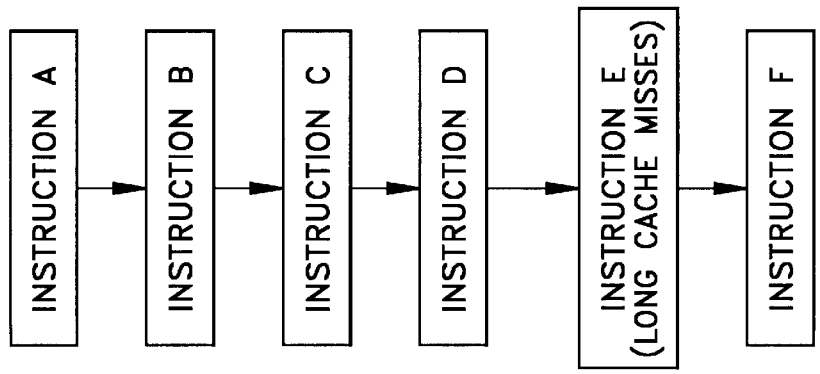
FIG. 12A depicts an instruction sequence where a long cache miss occurs.

FIG. 12A depicts an instruction sequence that contains an instruction, instruction E, that creates a long cache miss. FIG. 12B depicts a method of altering the code in real time by replacing instruction B with a branch instruction. The branch instruction branches to a preload or touch instruction that preloads the instruction or data cache prior to the offending instruction E such that the required instruction or data is available in the appropriate cache when required by instruction E. FIG. 12C depicts another method of altering the instruction sequence by inserting a preload instruction after instruction A and moving the remaining instructions down by one instruction location and adjusting any references as required.

While the invention has been shown and described with reference to particular embodiments thereof, it will be understood by those skilled in the art that the foregoing and other changes in form and detail may be made therein without departing from the spirit and scope of the invention.

What is claimed is:

1. An adaptive method for minimizing the effect of long cache misses in a processing system, comprising:
    a) profiling an application program by using a performance monitor to collect cache miss data;
    b) building effective address tables from the cache miss data to associate effective addresses of offending instructions that create long cache misses with the cache misses of lone duration; and
    c) optimizing the application program by inserting preload instructions in an instruction sequence of the application program object code prior to effective address positions of offending instructions that create long cache misses.

2. An adaptive method according to claim 1, further comprising applying an optimized change file to the object code of the application program.

3. An adaptive method for minimizing the effect of long cache misses in a processing system, comprising:
    a) initializing a performance monitor for monitoring cache misses;
    b) profiling an application program by using the performance monitor to collect cache miss data;
    c) building effective address tables from the cache miss data to associate effective addresses of offending instructions that create long cache misses with the cache misses of long duration;

d) optimizing the application program by determining where to position preload instructions in an instruction sequence of the application program object code prior to effective address positions of the offending instructions that create long cache misses;

e) building an optimized change file from the determination of the positions of the preload instructions in the instruction sequence;

f) applying the optimized change file to the object code of the application program;

g) testing the optimized object code for minimized long cache misses; and h) repeating steps a) through g) if long cache misses are not minimized.

4. An adaptive method according to claim 3, wherein step a) comprises setting bit configurations in control fields in a primary monitor mode control register for controlling a first performance monitor counter and a thresholder.

5. An adaptive method according to claim 4, wherein the setting bit configurations in control fields in the primary monitor mode control register comprises:

setting a first performance monitor counter control field for selecting cache misses for event counting by the thresholder and the first performance monitor counter; and setting a threshold value control field for selecting a threshold time interval value so that when a cache miss exceeds the threshold time interval value, the first performance monitor counter is caused to increment.

6. An adaptive method according to claim 3, wherein step a) comprises setting bit configurations in control fields in a primary monitor mode control register and a secondary monitor mode control register for controlling a plurality of performance monitor counters and a thresholder.

7. An adaptive method according to claim 3, wherein step b) comprises:

counting a predetermined number of cache misses that exceed a threshold time interval value in a first performance monitor counter;

signaling an interrupt when a most significant bit in the first performance monitor counter transitions from a logical 0 to a logical 1;

loading an effective address of an executing instruction into a sampled instruction address register when the interrupt is signaled; and loading an effective address of an operand of the executing instruction into a sampled data address register when the interrupt is signaled.

8. An adaptive method according to claim 7, further comprising executing an interrupt handling routine on the interrupt signaled by the first performance monitor counter, the interrupt handling routine causing the contents of the sampled instruction address register and the contents of the sampled data address register to be copied into tables in a memory.

9. An adaptive method according to claim 3, wherein step c) comprises:

examining the collected cache miss data;

determining the number of occurrences of cache misses that exceeded a predetermined threshold value resulting from an instruction at a saved effective address; and selecting the saved effective addresses with the largest number of cache miss occurrences for storing in the effective address tables.

10. An adaptive method according to claim 3, wherein step d) comprises:

determining if an average number of instructions per subroutine in a set of nested subroutines is known;

setting a midpoint subroutine equal to a threshold time interval value used for counting long cache misses divided by a product of a number of cycles per instruction and an average number of instructions per subroutine if the average number of instructions per subroutine is known;

setting the midpoint subroutine equal to a midpoint of a first subroutine and a last subroutine in the set of nested subroutines if the average number of instructions per subroutine is not known;

setting an instruction address breakpoint register to signal a first interrupt during execution of the midpoint subroutine;

inserting a preload instruction in the midpoint subroutine where the first interrupt is signaled;

setting an instruction address breakpoint register to signal a second interrupt after the first interrupt and during execution of the last subroutine at an address of an offending instruction that created a long cache miss;

determining a number of instructions and a time interval between the first interrupt and the second interrupt using performance monitor counters;

determining if the time interval between the first interrupt and the second interrupt is less than the threshold time interval value or greater than twice the time interval value used for counting long cache misses;

setting the midpoint subroutine to equal the midpoint between the first subroutine and the midpoint subroutine in the step of setting an instruction address breakpoint register to signal a first interrupt and repeating the steps of setting an instruction address breakpoint register to signal a first interrupt through determining a number of instructions and a time interval if the time interval between the first interrupt and the second interrupt is less than the threshold time interval value; and setting the midpoint subroutine to equal the midpoint between the last subroutine and the midpoint subroutine in the step of setting an instruction address breakpoint register to signal a first interrupt and repeating the steps of setting an instruction address breakpoint register to signal a first interrupt through determining a number of instructions and a time interval if the time interval between the first interrupt and the second interrupt is greater than twice the threshold time interval value.

11. An adaptive method according to claim 3, wherein step d) comprises:

determining an effective address of one of the offending instructions in the instruction sequence before which a preload instruction is to be placed;

single stepping through interrupts prior to the offending instruction so that a trace of an instruction sequence prior to the offending instruction is created;

determining a number of instructions prior to the offending instruction for inserting a preload instruction in the instruction sequence using a predetermined average instruction time and the trace of the instruction sequence; and determining the effective address of the preload instruction prior to the effective address of the offending instruction in the instruction sequence so that the long cache miss is completed prior to the execution of the offending instruction.

12. An adaptive method according to claim 3, wherein step e) comprises creating tables in a memory that contain effective addresses of the preload instructions and the associated preload instructions that, when applied to the application program, minimize effects of long cache misses.

13. An adaptive method according to claim 3, wherein step f) comprises inserting the optimized change file into the object code in real-time.

14. An adaptive method according to claim 3, wherein step f) comprises storing the optimized change file in the resident processing system for patching the application program off-line.

15. An adaptive method according to claim 3, wherein step f) comprises uploading the optimized change file to a server processing system for subsequent downloading to specific client processing systems.

16. An adaptive method according to claim 3, wherein step f) comprises exporting the optimized change file for use in recompiling the processing program.

17. A system for minimizing the effect of long cache misses in a processing system, comprising:
 a) means for initializing a performance monitor for monitoring cache misses;
 b) means for profiling an application program by using the performance monitor to collect cache miss data;
 c) means for building effective address tables from the cache miss data to associate effective addresses of offending instructions that create long with the cache misses of long duration;
 d) means for optimizing the application program by determining where to position preload instructions in an instruction sequence of the application program object code prior to effective address positions of the offending instructions that create long cache misses;
 e) means for building an optimized change file from the determination of the positions of the preload instructions in the instruction sequence;
 f) means for applying the optimized change file to the object code of the application program;
 g) means for testing the optimized object code for minimized long cache misses; and
 h) means for repeating steps a) through g) if long cache misses are not minimized.

18. A system according to claim 17, wherein step a) comprises means for setting bit configurations in control fields in a primary monitor mode control register for controlling a first performance monitor counter and a thresholder.

19. A system according to claim 18, wherein the setting bit configurations in control fields in the primary monitor mode control register comprises:
 means for setting a first performance monitor counter control field for selecting cache misses for event counting by the thresholder and the first performance monitor counter; and
 means for setting a threshold value control field for selecting a threshold time interval value so that when a cache miss exceeds the threshold time interval value, the first performance monitor counter is caused to increment.

20. A system according to claim 17, wherein step a) comprises means for setting bit configurations in control fields in a primary monitor mode control register and a secondary monitor mode control register for controlling a plurality of performance monitor counters and a thresholder.

21. A system according to claim 17, wherein step b) comprises:
 means for counting a predetermined number of cache misses that exceed a threshold time interval value in a first performance monitor counter;
 means for signaling an interrupt when a most significant bit in the first performance monitor counter transitions from a logical 0 to a logical 1;
 means for loading an effective address of an executing instruction into a sampled instruction address register when the interrupt is signaled; and
 means for loading an effective address of an operand of the executing instruction into a sampled data address register when the interrupt is signaled.

22. A system according to claim 21, further comprising means for executing an interrupt handling routine on the interrupt signaled by the first performance monitor counter, the interrupt handling routine causing the contents of the sampled instruction address register and the contents of the sampled data address register to be copied into tables in a memory.

23. A system according to claim 17, wherein step c) comprises:
 means for examining the collected cache miss data;
 means for determining the number of occurrences cache misses that exceeded a predetermined threshold value resulting from an instruction at a saved effective address; and
 means for selecting the saved effective addresses with the largest number of cache miss occurrences for storing in an effective address table.

24. A system according to claim 17, wherein step d) comprises:
 means for determining if an average number of instructions per subroutine in a set of nested subroutines is known;
 means for setting a midpoint subroutine equal to a threshold time interval value used for counting long cache misses divided by a product of a number of cycles per instruction and an average number of instructions per subroutine if the average number of instructions per subroutine is known;
 means for setting the midpoint subroutine equal to a midpoint of a first subroutine and a last subroutine in the set of nested subroutines if the average number of instructions per subroutine is not known;
 means for setting an instruction address breakpoint register to signal a first interrupt during execution of the midpoint subroutine;
 means for inserting a preload instruction in the midpoint subroutine where the first interrupt is signaled;
 means for setting an instruction address breakpoint register to signal a second interrupt after the first interrupt and during execution of the last subroutine at an address of an offending instruction that created a long cache miss;
 means for determining a number of instructions and a time interval between the first interrupt and the second interrupt using performance monitor counters;
 means for determining if the time interval between the first interrupt and the second interrupt is less than the threshold time interval value or greater than twice the time interval value used for counting long cache misses;

means for setting the midpoint subroutine to equal the midpoint between the first subroutine and the midpoint subroutine in the step of setting an instruction address breakpoint register to signal a first interrupt and repeating the steps of setting an instruction address breakpoint register to signal a first interrupt through determining a number of instructions and a time interval if the time interval between the first interrupt and the second interrupt is less than the threshold time interval value; and means for setting the midpoint subroutine to equal the midpoint between the last subroutine and the midpoint subroutine in the step of setting an instruction address breakpoint register to signal a first interrupt and repeating the steps of setting an instruction address breakpoint register to signal a first interrupt through determining a number of instructions and a time interval if the time interval between the first interrupt and the second interrupt is greater than twice the threshold time interval value.

25. A system according to claim 17, wherein step e) comprises means for creating tables in a memory that contain effective addresses of the preload instructions and the associated preload instructions that, when applied to the application program, minimize effects of long cache misses.

26. A system according to claim 17, wherein step f) comprises means for inserting the optimized change file into the object code in real-time.

27. A system according to claim 17, wherein step f) comprises means for storing the optimized change file in the resident processing system for patching the application program off-line.

28. A system according to claim 17, wherein step f) comprises means for uploading the optimized change file to a server processing system for subsequent downloading to specific client processing systems.

29. A computer-programmed method for minimizing the effect of long cache misses, comprising the steps of:

a) initializing computer programmable performance monitor hardware for monitoring cache misses;

b) profiling an application program by using the performance monitor hardware to collect cache miss data;

c) building effective address tables in computer memory from the cache miss data to associate effective addresses of offending instruction that create long cache misses with the cache misses of long duration;

d) optimizing the application program by determining where to position preload instructions in an instruction sequence of the application program object code prior to effective address positions of the offending instructions that create long cache misses;

e) building an optimized change file in computer memory from the determination of the positions of the preload instructions in the instruction sequence;

f) applying the optimized change file to the object code of the application program;

g) testing the optimized object code for minimized long cache misses; and h) repeating steps a) through g) if long cache misses are not minimized.

30. A computer-programmed method according to claim 29, wherein the step of applying the optimized change file to the object code of the application program comprises inserting the optimized change file into the object code in real-time.

* * * * *